US009702416B2

(12) United States Patent
Shao et al.

(10) Patent No.: US 9,702,416 B2
(45) Date of Patent: Jul. 11, 2017

(54) LINEAR SENSOR

(71) Applicant: KSR IP Holdings, LLC, Wilmington, DE (US)

(72) Inventors: Lingmin Shao, Ridgetown (CA); Jim Hartford, Blenheim (CA)

(73) Assignee: KSR IP Holdings, LLC, Wilmington, DE (US)

( * ) Notice: Subject to any disclaimer, the term of this patent is extended or adjusted under 35 U.S.C. 154(b) by 132 days.

(21) Appl. No.: 14/537,276

(22) Filed: Nov. 10, 2014

(65) Prior Publication Data

US 2015/0129389 A1 May 14, 2015

Related U.S. Application Data

(60) Provisional application No. 61/901,749, filed on Nov. 8, 2013.

(51) Int. Cl.
*F16D 25/12* (2006.01)
*F16D 48/06* (2006.01)
*G01D 5/14* (2006.01)

(52) U.S. Cl.
CPC ........... *F16D 25/12* (2013.01); *F16D 48/062* (2013.01); *G01D 5/145* (2013.01); *F16D 2300/18* (2013.01); *F16D 2500/3026* (2013.01); *F16D 2500/30401* (2013.01)

(58) Field of Classification Search
CPC ........ F16D 25/00–25/14; F16D 48/062; F16D 2300/18; F16D 2500/3026; F16D 2500/30401; G01D 5/142; G01D 5/145
See application file for complete search history.

(56) References Cited

U.S. PATENT DOCUMENTS

| 4,705,151 A * | 11/1987 | Leigh-Monstevens et al. ............... B60K 28/00 192/111.12 |
| 5,506,502 A | 4/1996 | Maennle |
| 6,563,305 B1 | 5/2003 | Sorsa et al. |
| 6,670,804 B1 | 12/2003 | Glemser et al. |

(Continued)

FOREIGN PATENT DOCUMENTS

| EP | 2369291 A1 | 9/2011 |
| JP | 2008216044 A | 9/2008 |

(Continued)

OTHER PUBLICATIONS

International Search Report and Written Opinion dated Jun. 7, 2012 relating to PCT/IB2012/000401.

*Primary Examiner* — Richard Lorence
(74) *Attorney, Agent, or Firm* — Dinsmore & Shohl LLP

(57) ABSTRACT

The present invention uses a sensor to determine when a pressure plate and a clutch plate of a dual clutch transmission system are in contact with one another. The assembly includes a housing having a plurality of pistons connected to both the clutch plate and pressure plate. The pistons contain either magnets or couplers and are positioned adjacent one another separated by either a Hall effect sensor or an inductive sensor. As the pressure plates and clutch plates come into contact with one another the pistons move within the housing and said movement is detected by the sensor. The sensor determines if the pressure plate is in contact with the clutch plate and if the clutch plate or the pressure plate has traveled any linear distance.

19 Claims, 8 Drawing Sheets

(56) References Cited

U.S. PATENT DOCUMENTS

| | | |
|---|---|---|
| 7,562,591 B2 | 7/2009 | Lee |
| 8,988,066 B2 | 3/2015 | Shao et al. |
| 2002/0112552 A1* | 8/2002 | Harries ............... F16H 61/2807 74/335 |
| 2003/0080706 A1 | 5/2003 | Waite |
| 2004/0239313 A1 | 12/2004 | Godkin |
| 2005/0000772 A1* | 1/2005 | Wohner ................ F16D 25/088 192/30 W |
| 2005/0231197 A1* | 10/2005 | Reininger et al. ..... G01B 7/003 324/251 |
| 2008/0134727 A1 | 6/2008 | May |
| 2009/0079422 A1 | 3/2009 | Lee |
| 2011/0139571 A1* | 6/2011 | Acker et al. ............ F16D 21/06 192/85.01 |
| 2012/0025809 A1 | 2/2012 | Banerjee et al. |
| 2012/0056616 A1 | 3/2012 | May |
| 2012/0056739 A1 | 3/2012 | Lee et al. |

FOREIGN PATENT DOCUMENTS

| | | |
|---|---|---|
| KR | 10-2004-0010938 | 7/2002 |
| KR | 10-0932444 B1 | 12/2009 |

\* cited by examiner

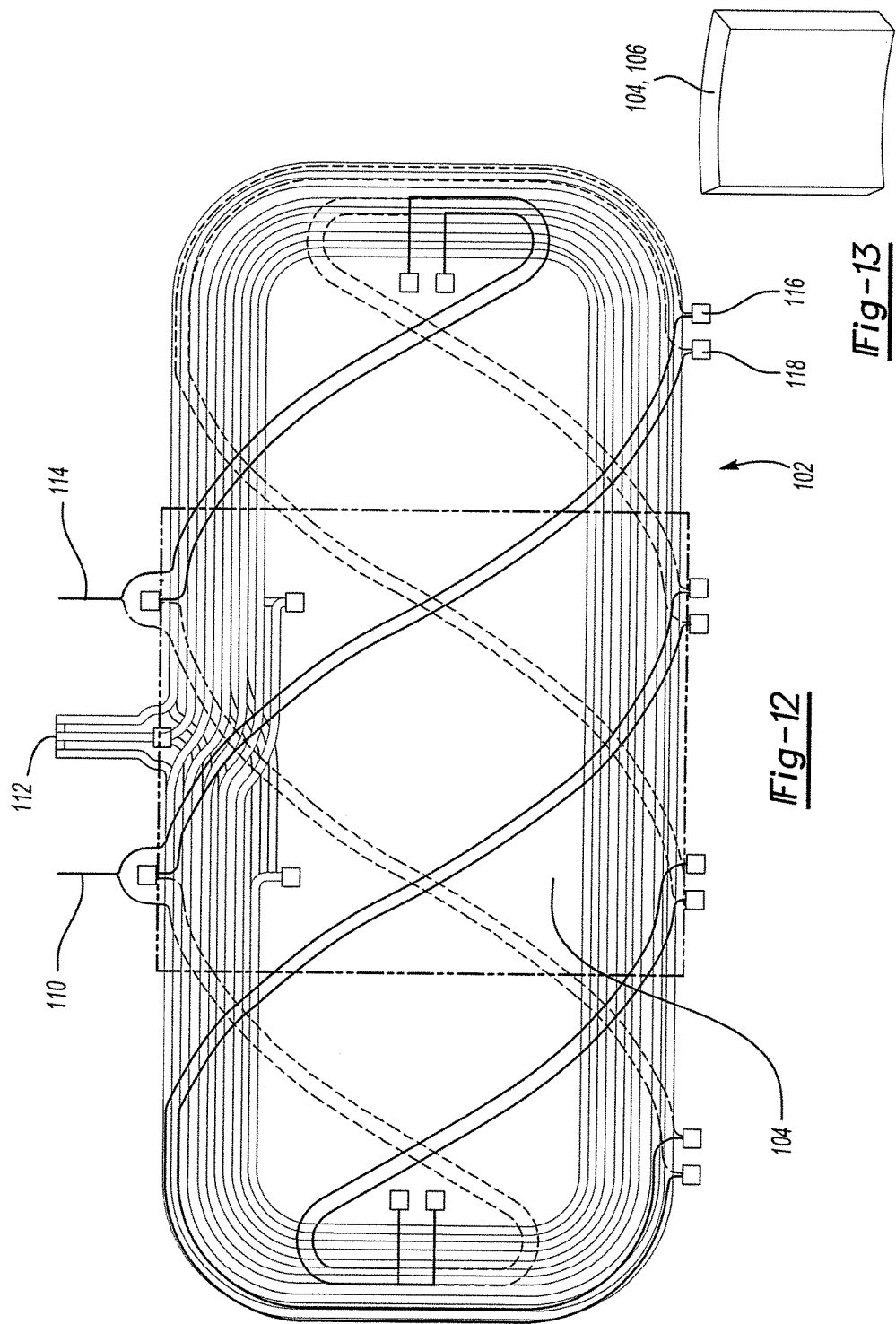

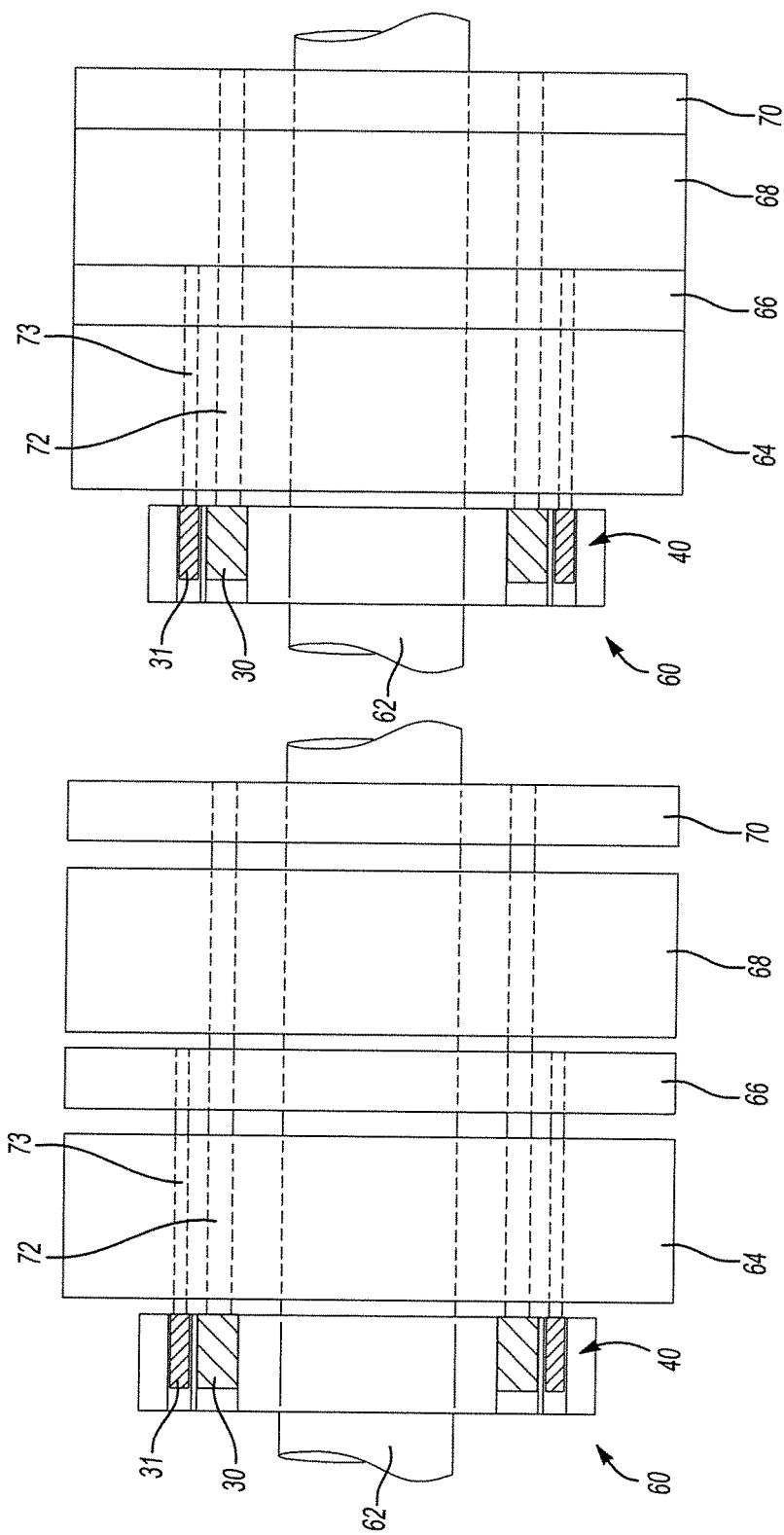

LINEAR SENSOR

CROSS-REFERENCE TO RELATED APPLICATIONS

This utility patent application claims priority from U.S. provisional patent application Ser. No. 61/901,749, filed Nov. 8, 2013, the entire contents of which is incorporated herein in its entirety.

FIELD OF THE INVENTION

The present invention relates generally to sensors. More particularly, the present invention relates to a linear sensor for use in a dual clutch transmission.

BACKGROUND OF THE INVENTION

Dual clutch transmission systems are well known in the art. Dual clutch transmission systems typically include two clutch plates and two pressure plates mounted around a driveshaft. The pressure plates come into contact with the clutch plates during operation of the clutch system. It is advantageous to know when the pressure plates come into contact with the clutch plates of the transmission system. However, there is no known method to determine and sense movement of the pressure plate to be in contact with the clutch plate. As such, there exists a need in the art to provide a sensor system to detect movement within the transmission system of a dual clutch transmission when the pressure plate comes into contact with the clutch plate or to measure linear travel of the plates.

SUMMARY OF THE INVENTION

The present invention uses a sensor to determine when a pressure plate and a clutch plate of a dual clutch transmission system are in contact with one another. The assembly includes a housing having a plurality of pistons connected to both the clutch plate and pressure plate. The pistons contain either magnets or couplers and are positioned adjacent one another separated by either a Hall effect sensor or an inductive sensor. As the pressure plates and clutch plates come into contact with one another the pistons move within the housing and said movement is detected by the sensor. The sensor determines if the pressure plate is in contact with the clutch plate and if the clutch plate or the pressure plate has traveled any linear travel.

BRIEF DESCRIPTION OF THE DRAWINGS

FIG. 12 illustrates the inductive sensor and coupler of the present invention;

FIG. 13 illustrates a perspective view of the coupler of the present invention;

FIG. 15 illustrates a dual clutch transmission assembly having the sensor assembly of the present invention; and FIG. 16 illustrates the dual clutch transmission assembly of the present invention where the pressure plates are in contact with the clutch plates.

DETAILED DESCRIPTION OF THE INVENTION

In one non-limiting embodiment, the present invention uses a sensor to determine when a pressure plate and a clutch plate of a dual clutch transmission system are in contact with one another. The assembly includes a housing having a plurality of pistons connected to both the clutch plate and pressure plate. The pistons contain either magnets or couplers and are positioned adjacent one another separated by either a Hall effect sensor or an inductive sensor. As the pressure plates and clutch plates come into contact with one another the pistons move within the housing and said movement is detected by the sensor. The sensor determines if the pressure plate is in contact with the clutch plate and if the clutch plate or the pressure plate has traveled any linear distance.

Figure 7:
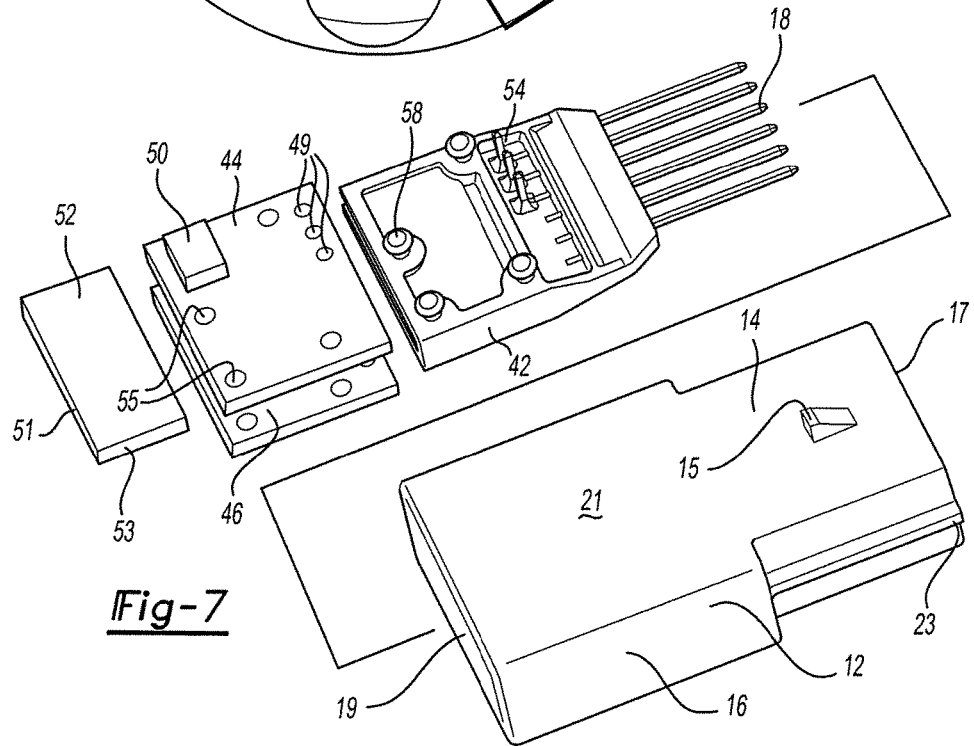
FIG. 7 illustrates an exploded perspective view of the sensor of the present invention.
Figure 4:
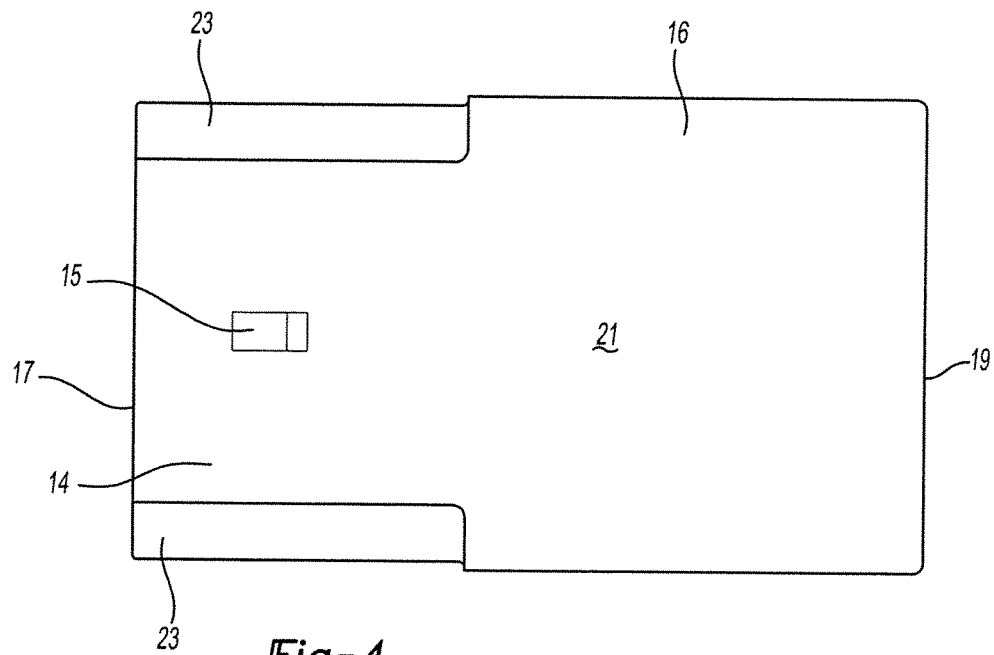
FIG. 4 illustrates a top view of the sensor of the present invention.
Figure 5:
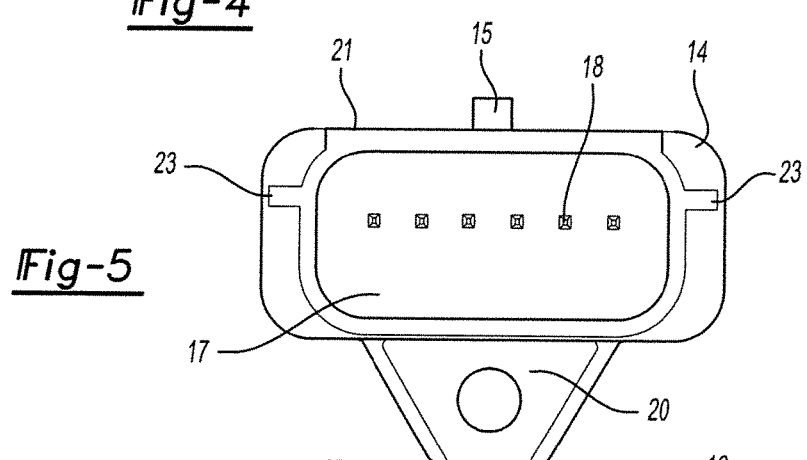
FIG. 5 illustrates a side view of the sensor of the present invention.
Figure 6:
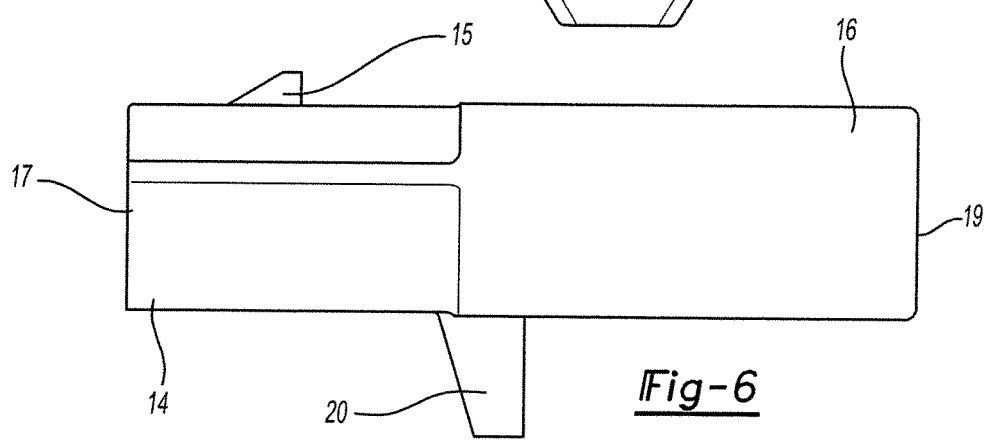
FIG. 6 illustrates an alternative side view of the sensor of the present invention.

Referring initially to FIGS. 1-6, a sensor assembly is generally referenced at 10 and includes a linear sensor with an outer casing 12 having an upper portion 14 and a lower portion 16. The sensor includes a plurality of pins 18 in the upper portion and which are embedded within an encapsulating material 17 as shown in FIG. 5 to connect to an ECU (Electronic Control Unit) 11 or other suitable computer for processing information. The sensor assembly 10 further includes a connector or attachment portion 20 formed with the outer casing 12 and allowing the sensor assembly to connect to a housing 40 of the present invention. The housing 40 is a generally cylindrical shaped body with an open interior 47 and includes opposite disc shaped end faces, at 41, an annular perimeter extending outer surface 43 to which is mounted the sensor 10, and an intermediate transition surfaces 45 between the end face 41 and outer surface 43. The sensor components, as will be further described in reference to FIG. 7, are likewise contained within the encapsulation material 17 of the sensor assembly 10 between an open front and opposite closed rear 19 of the casing 12. Other features include an engagement projection 15 extending from the outer casing 12 on a side 21 opposite the attachment portion 20. As further depicted in the front end view of FIG. 5, the upper portion 14 of the casing 12 further includes a pair of projecting ribbed or winged edges 23.

Figure 1:
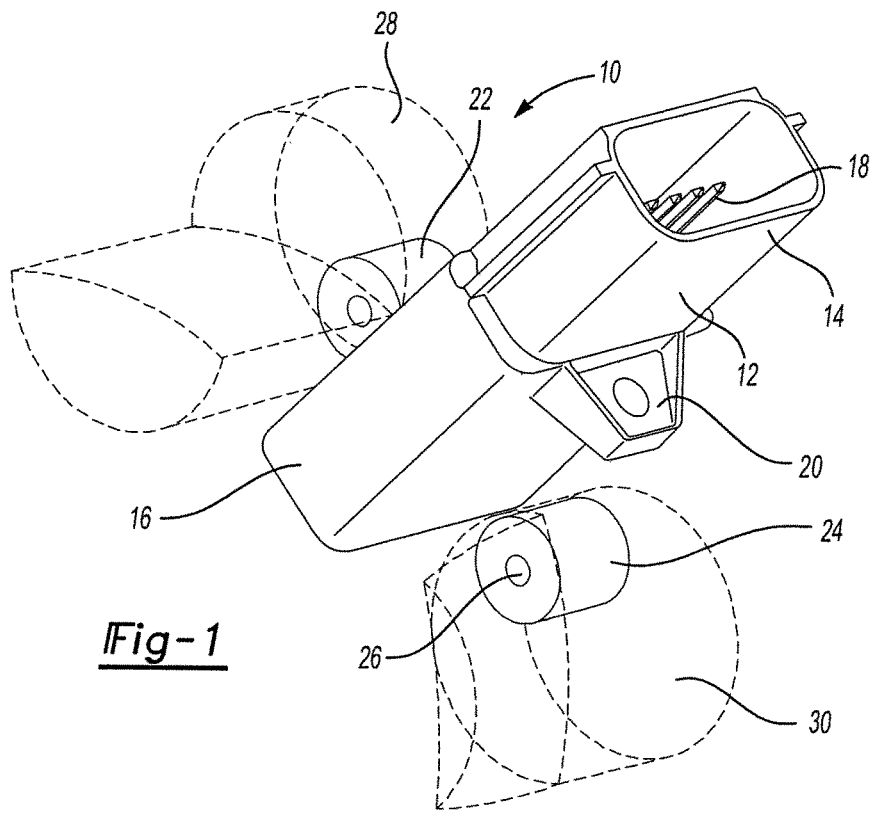
FIG. 1 illustrates a perspective view of a first embodiment of the sensor assembly of the present invention.
Figure 2:
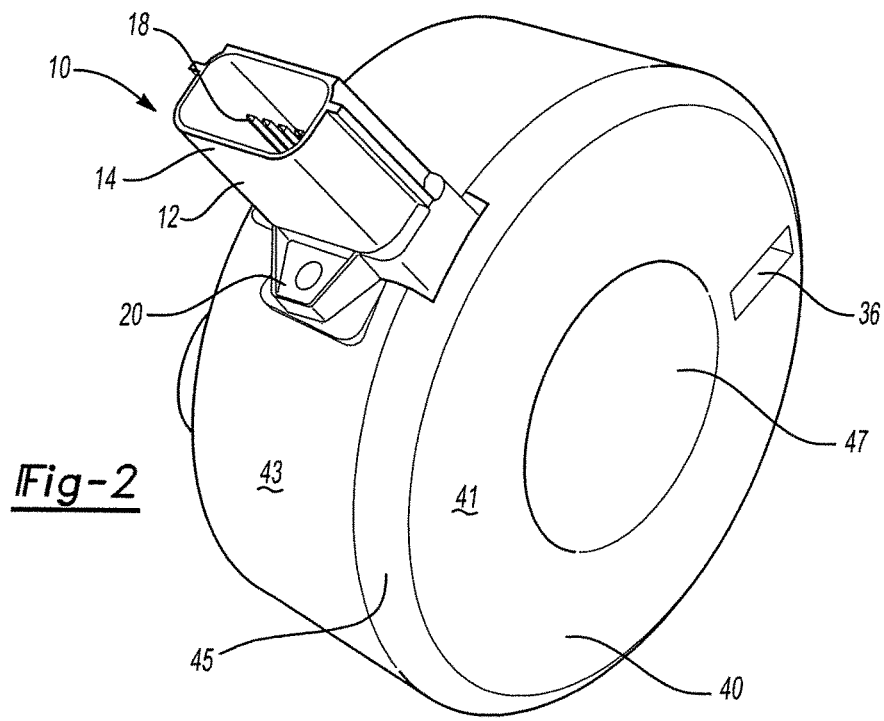
FIG. 2 illustrates the sensor assembly installed within the housing of the present invention.
Figure 3:
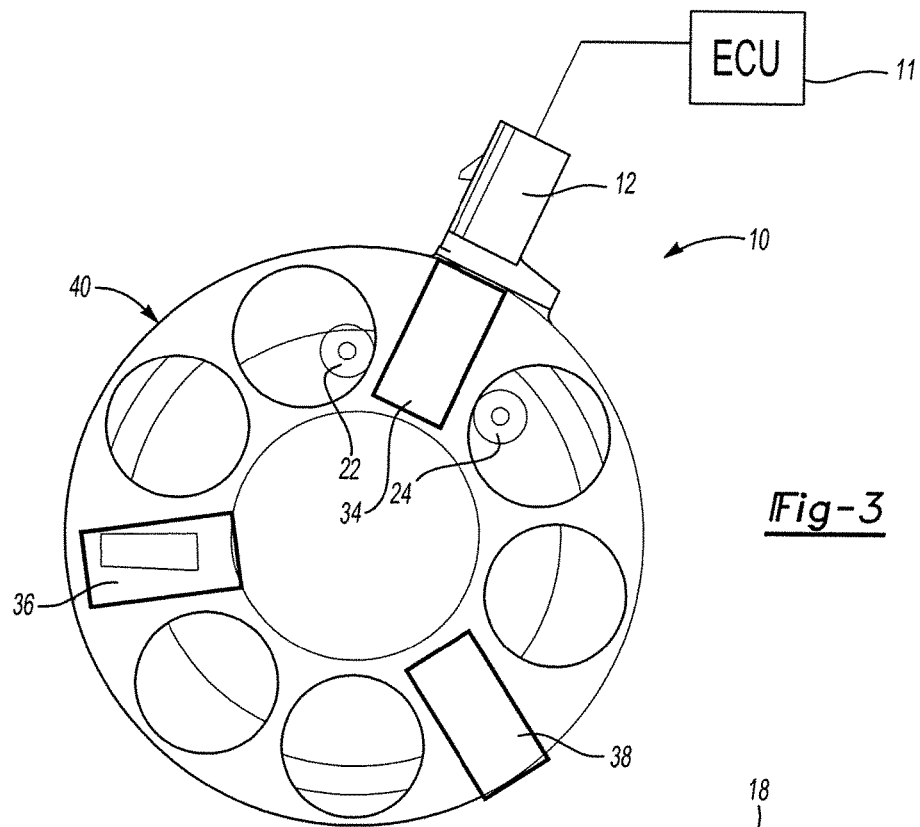
FIG. 3 illustrates a front view of the housing of the present invention.

A plurality of pistons 28, 30 are disposed within the housing 40 (see FIGS. 1 and 3). The housing 40 includes a plurality of potential areas 34, 36 and 38 (FIG. 3) extending around an outer ring of the housing 40 where the sensor could be placed. It is further understood that any number of sensors could be utilized in these areas to provide plural linear distance readings corresponding to the travel of the clutch plates and the pressure plates. The apertures 34 are positioned in sets being spaced apart by the sensor assembly 10. In the present embodiment, only one sensor assembly 10 is utilized. In other embodiments, numerous sensors may be utilized and positioned between the sets of pistons 28, 30 located at areas 36, 38, as illustrated in FIG. 3.

The pistons 28, 30 include magnets 22, 24 to create the magnetic field sensed by the sensor. The magnets (AlNiCo) are located in adjacent piston sets. The magnets 22, 24 can be other material such as SmCo or NdFe magnet, the magnetization direction could be axial or diametrical. The linear sensor assembly 10 uses Hall effect technology to sense and calculate movement of the pistons 28, 30 within the housing 40. This movement corresponds to movement of the clutch plate and pressure plate of the dual clutch transmission systems as illustrated in FIGS. 15 and 16. The magnets 22, 24 each include an aperture 26 (FIG. 1) extending axially through the magnet. In the present embodiment the magnets are mounted in the interior of the pistons 28, 30.

Figure 9:
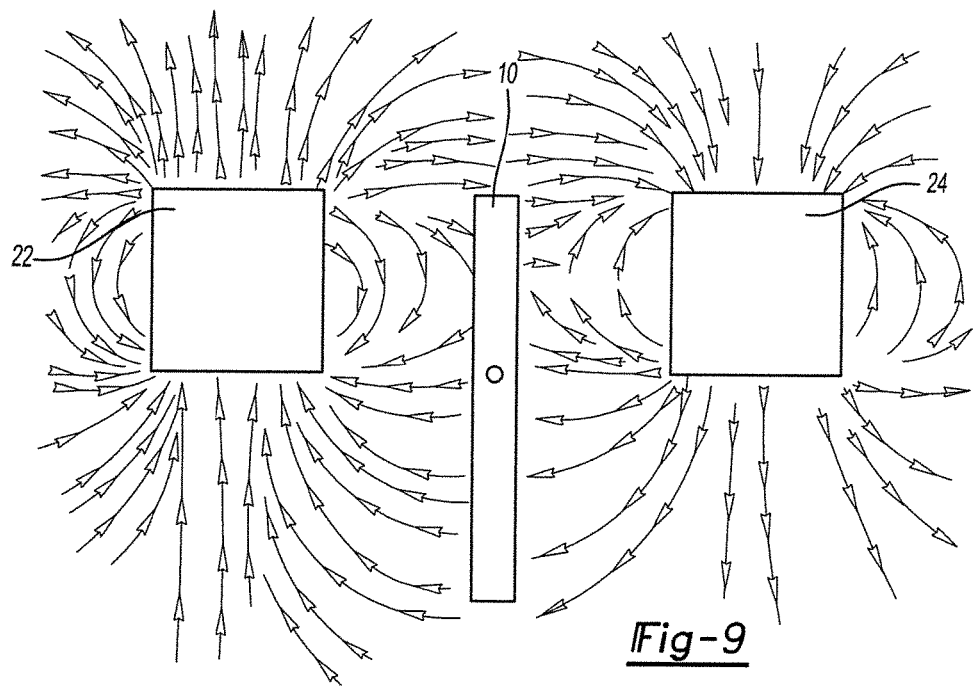
FIG. 9 illustrates a side view of the magnets with respect to the sensor of the present invention.

FIG. 9 illustrates the magnetic field and movement of the magnets 22 and 24 with respect to the sensor assembly 10. As illustrated in FIG. 9, the magnets 22, 24 create a magnetic field illustrated by the numerous arrows illustrated in the figure. As the magnets move within the housing 40, the magnetic field changes and is sensed by the sensor assembly 10. This movement is determined by the changes in magnetic field. The sensor then communicates the information to an ECU, computer, or other processor.

FIGS. 1-8 illustrate the specifics of the sensor of the present invention. The sensor assembly 10 utilizes Hall effect technology to sense and determine movement of the magnets and the piston within the system. As previously described, the encapsulation material 17 extends over the upper portion 14 and the lower portion 16 of the casing. The encapsulation material 17 is over molded over the components of the sensor assembly and, in the present embodiment, is a thermoset material but may be other plastics polymers as suitable. As best shown in FIG. 7, the terminal pins 18 are provided connected to a carrier plate 42. The carrier plate 42 includes pins 54 operable to connect to a pair of Printed Wiring Assemblies (hereinafter referred to as PWAs) 44, 46. The carrier plate 42 further includes connection tabs 58 allowing the carrier plate 42 to connect the PWAs 44, 46. FIG. 7 illustrates an example of a PWA configuration. The PWA configuration may be modified as required by the apparatus.

The PWAs 44, 46 include a plurality of apertures 49, 55. The apertures 49 are operable to connect to the pins 54 of the carrier plate 42. The apertures 55 are operable to connect to the tabs 58 of the carrier plate 42. The PWAs 44, 46 each include a Hall chip 50. A Hall chip 50 is provided on each of the PWAs 44, 46. Each Hall chip 50 senses one of the magnets and magnetic field provided within the pistons. The Hall chips 44, 46 can be any magnetic IC that measures the magnetic field direction including Hall-effect and anisotropic magnetoresistance (AMR) chip.

Figure 8:
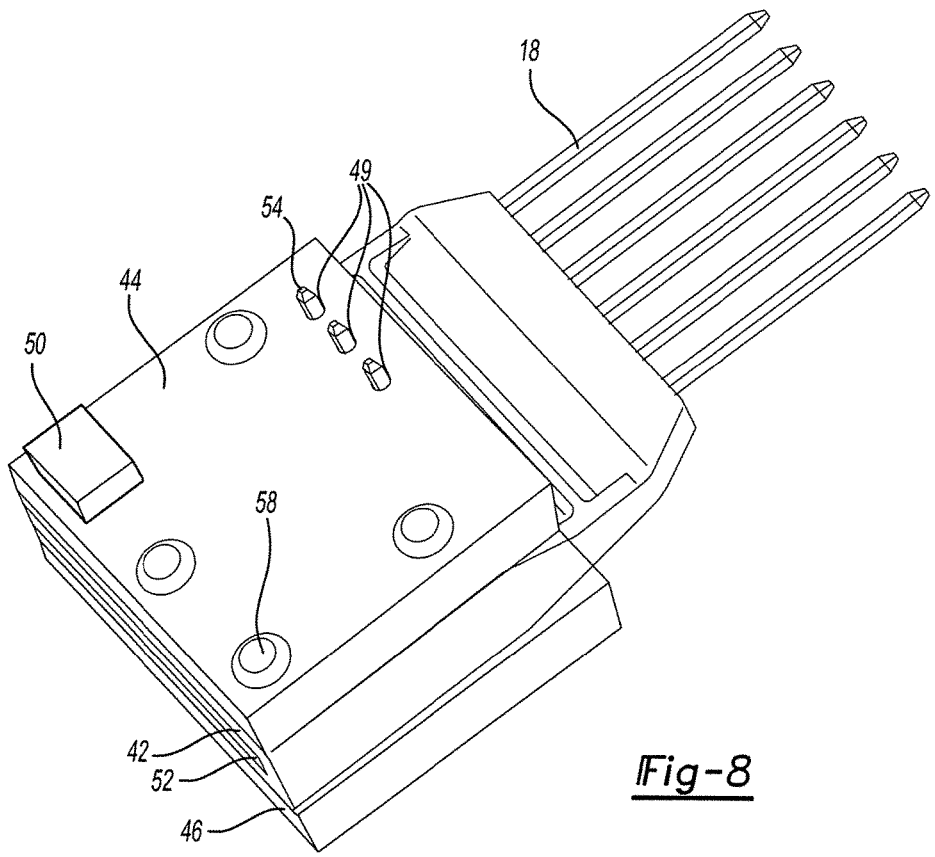
FIG. 8 illustrates a perspective view of a portion of the sensor of the present invention.

A magnetic shield 52, defining a thin rectangular body with a rear surface 51 and an end surface 53 is further provided between the PWAs 44, 46. The magnetic shield 52, in the present embodiment, is made of steel and is used to separate and block magnetic fields between the Hall chips 50 on each of the PWAs 44, 46. FIG. 8 is viewed in combination with the exploded view of FIG. 7 and depicts the sensor components in an assembled configuration such as integrated into the overall assembly secured to the housing 40 in FIGS. 1 and 2.

Reference is now made to FIGS. 15 and 16. FIG. 15 illustrates a clutch assembly 60 of the present invention. The clutch assembly 60 includes a transmission shaft 62 having the housing 40 extending around the shaft. Clutch plates 64, 68 are provided adjacent to and alternate with pressure plates 66, 70 acting parallel to one another. In the present embodiment, each set of pistons activates a different clutch plate. In the illustrated variant, there are two clutches acting parallel to each other.

In FIG. 15, the components of the assembly 60 are spaced apart from one another. A rod 31 and associated connector 73 extends through each of the clutch plate 64 and adjoining pressure plate 66, so that the connectors 72, 73 connect the components of the clutch assembly 60 to the pistons 30. In operation, the piston 30 moves within the housing 40 and the movement is sensed by the sensor assembly 10. When the pressure plates 66, 70 are in contact with the clutch plates 64, 68, respectively, the pistons move within the assembly and this movement to the point of contact is sensed by the sensor assembly and transmitted to the ECU of the assembly. The sensors sense when the pressure plate comes into contact with its respective clutch plate. Each piston set is in communication with one clutch plate and one pressure plate.

Figure 10:
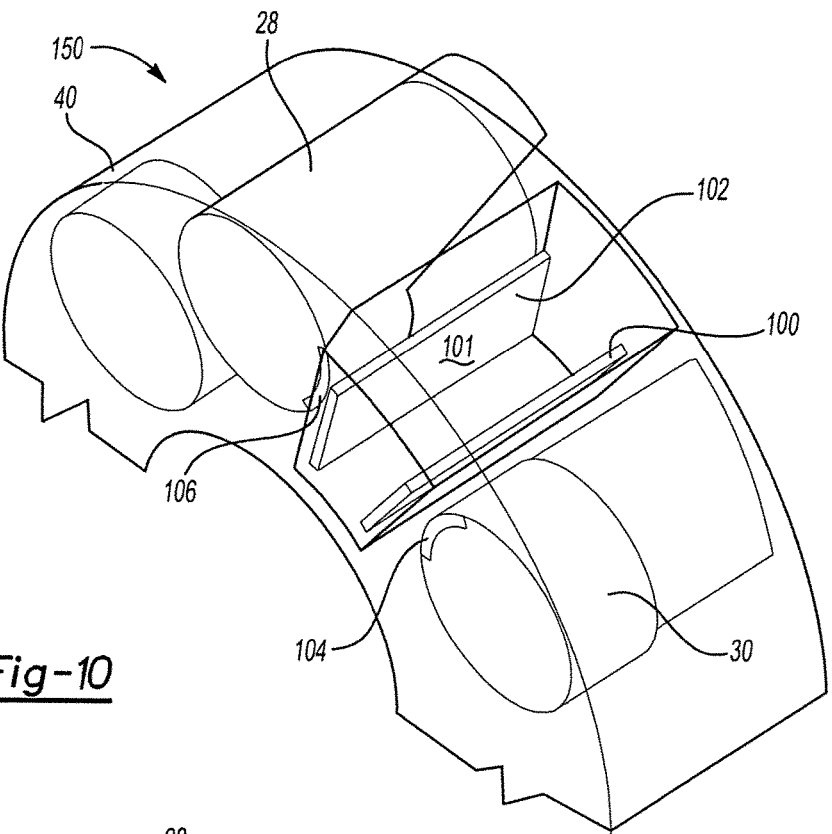
FIG. 10 illustrates a perspective view of the sensor assembly of the present invention with encapsulation material.
Figure 11:
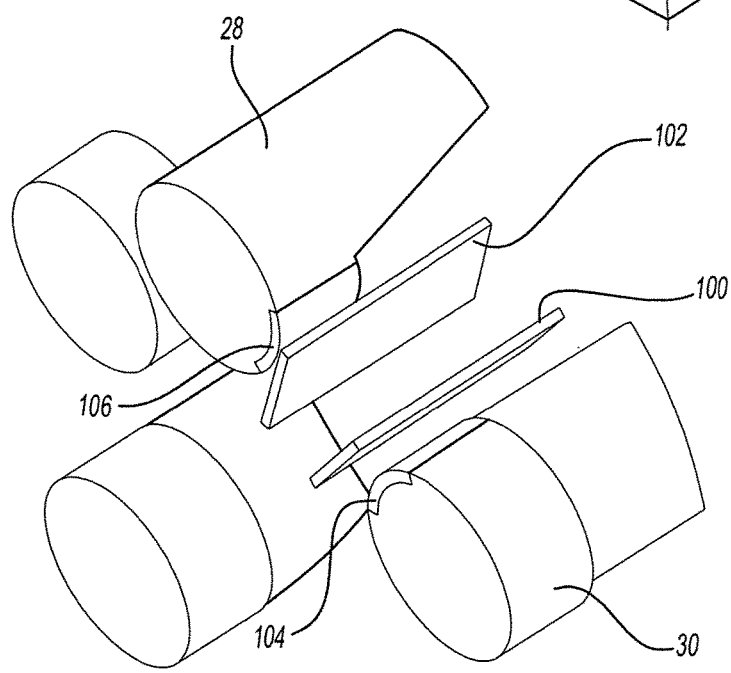
FIG. 11 illustrates a perspective view of the sensor assembly of the present invention without encapsulation material.

FIGS. 10-11 illustrate an alternative embodiment in a linear inductive sensor used in a similar fashion to detect movement of the pistons within the system. The linear inductive sensor assembly 150 includes a modified housing 40' having the pistons 28, 30. The pistons 28, 30 each include a coupler 104, 106. The couplers 104, 106 are curved and incorporated within the pistons 28, 30. The couplers 104, 1.06 are made of aluminum.

FIGS. 10 and 11 illustrate sensors 100, 102 are positioned between the couplers 104, 106. The sensors 100, 102 are aligned to be tangent to the couplers 104, 106. This alignment is further illustrated in each of FIGS. 10-11. Movement of the couplers 104, 106 with the pistons 28, 30 with respect to the sensors 100, 102 creates changes in the magnetic field thus allowing an ECU to determine the position changes of the pistons 28, 30. The couplers 104, 106 change the eddy current and thus allow for calculations of displacement and movement allowing the ECU to determine when the pressure plate is in contact with the clutch plate.

Figure 14:
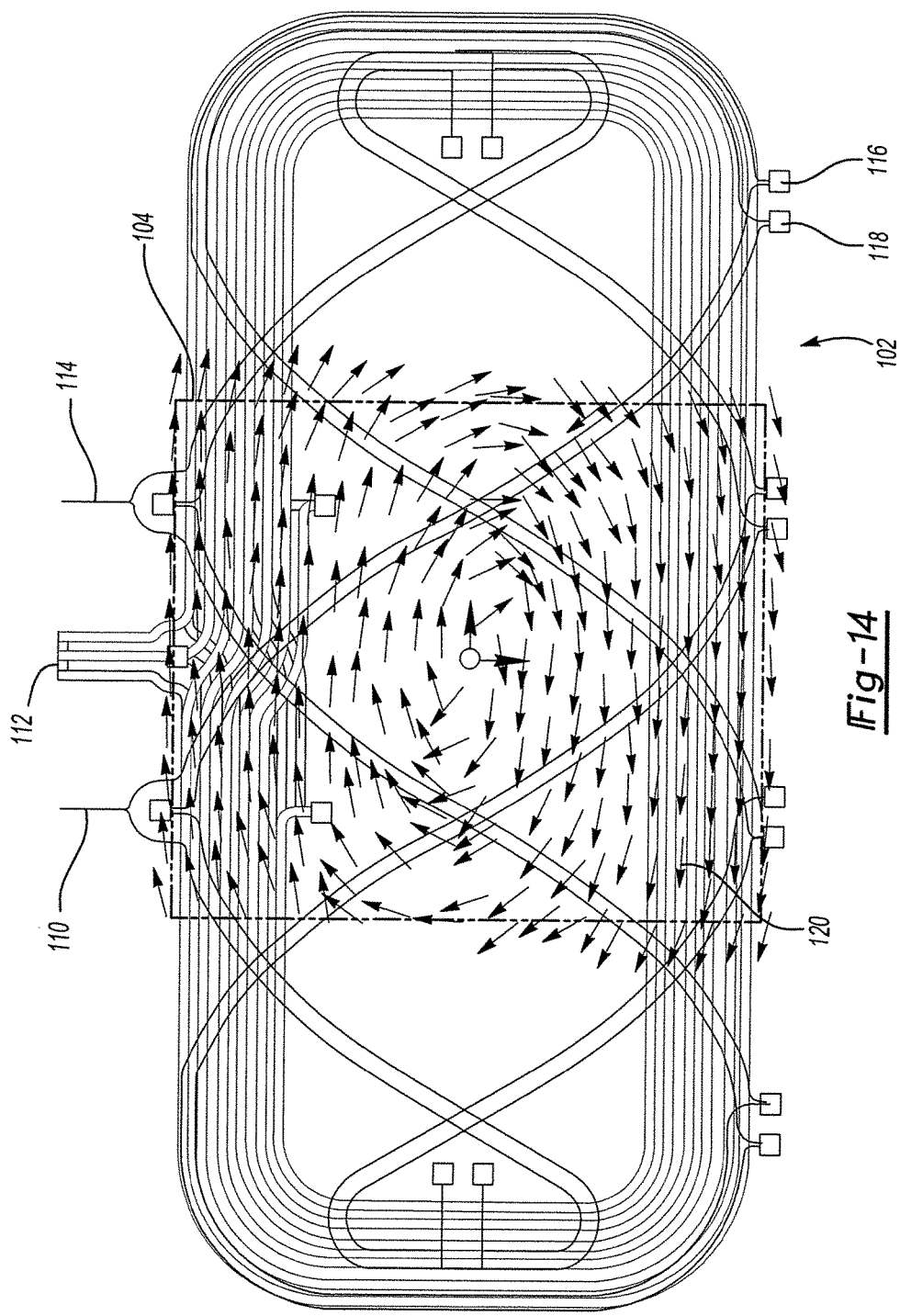
FIG. 14 illustrates the sensor and magnetic field of the inductive sensor of the present invention.

The coils and connectors of the sensor are illustrated in FIG. 12. The coils having various connectors and inputs 110, 112, 114 are utilized on PWA and incorporated within a similar sensor as shown in the previous embodiment. A magnetic field 120 is illustrated in FIG. 14 and changes as the aluminum couplers 104, 106 are moved within the housing 150, with outputs 116 and 118 feeding a voltage convertible signal representative of the changes in the fields.

A sensor for a clutch assembly having a plurality of clutch plates and pressure plates is provided. A housing is positioned adjacent the plurality of clutch plates and pressure plates. At least one piston connected to the clutch plates and the pressure plates, the pistons movable within the housing. A sensor is provided including a magnet connected to the at least one piston and a printed wiring assembly (PWA) in communication with the magnet. The PWA is further in communication with an ECU, the PWA having at least one Hall chip mounted thereon operable to measure a change in magnetic field as the piston moves in response to movement of the clutch plates and the pressure plates, the ECU adapted to determine the linear distance traveled of the clutch plates and pressure plates.

The housing in generally disc shaped and positioned around the transmission shaft. The PWA and the Hall chip are encapsulated. In one embodiment, two PWAs provided each having a Hall chip. Further, the PWAs and the Hall chips are separated by a magnetic shield adapted to block and separate the magnetic field between the Hall chips.

In an alternative embodiment, a sensor for a clutch assembly having a plurality of clutch plates and pressure plates, a housing positioned adjacent the plurality of clutch plates and pressure plates, at least one piston connected to the clutch plates and the pressure plates, the pistons movable within the housing is provided. The sensor includes a coupler connected to the at least one piston and a printed wiring assembly (PWA) in communication with the coupler, the PWA further in communication with an ECU, the PWA operable to measure a change in magnetic field as the piston moves in response to movement of the clutch plates and the pressure plates, the ECU adapted to determine the linear distance traveled of the clutch plates and pressure plates.

In one embodiment, the coupler is positioned on the outside of the piston. The coupler is curved to accommodate the external shape of the piston. The PWA is positioned tangent to the coupler. In one embodiment, PWAs are provided in communication with two pistons. Further, the PWA is encapsulated.

Discussed generally relating to a clutch assembly, a clutch assembly for a vehicle is provided. The assembly include at least one clutch plate position around a transmission shaft, at least one pressure plate pressure plate positioned adjacent to the at least one clutch plate, the at least one pressure plate positioned around the transmission shaft, a housing positioned adjacent the plurality of clutch plates and pressure plates, the housing positioned around the transmission shaft, at least one piston connected to the clutch plates and the pressure plates, the pistons movable within the housing and a printed wiring assembly (PWA) in communication with the pistonr, the PWA further in communication with an ECU, the PWA operable to measure a change in magnetic field as the piston moves in response to movement of the clutch plates and the pressure plates, the ECU adapted to determine the linear distance traveled of the clutch plates and pressure plates.

The piston may include a coupler in communication with the PWA. Alternatively, the piston includes a magnet mounted thereon and in communication with the PWA. In one embodiment, the clutch assembly is a dual clutch assembly. The PWA is encapsulated. In one embodiment, two PWAs are provided in communication with two pistons.

A PWA, or printed wiring assembly, may also be known as a printed wiring board, printed circuit board (PCB), circuit board or a printed circuit assembly. A PWA may also be referred to as a board. The board or PWA is a flat plastic or fiberglass board on which interconnected circuits and components are laminated or etched. The board is operable to measure a change in the magnetic field. Chips and other electronic components are mounted on the circuits. Computers consist of one or more printed circuit boards, usually called cards or adapters. The PWA may also be referred to as a motherboard and further defined as a printed circuit board through which signals between all other boards are routed, a rigid slotted board upon which other boards that contain the basic circuitry of a computer or of a computer component can be mounted or main circuit board of a computer, usually containing the central processing unit and main system memory as well as circuitry that controls the disk drives, keyboard, monitor, and other peripheral devices.

An Electronic Control Unit, or ECU, is any embedded system that controls one or more of the electrical system or subsystems in a motor vehicle. Types of ECU include electronic/engine control module (ECM), powertrain control module (PCm), transmission control module (TCM), brake control module (BCM or EBCM), central control module (CCM), central timing module (CTM), general electronic module (GEM), body control module (BCM), suspension control module (SCM), control unit, or control module. Taken together, these systems are sometimes referred to as the car's computer. (Technically there is no single computer but multiple ones.) Sometimes one assembly incorporates several of the individual control modules (PCM is often both engine and transmission). The ECU used in the present invention communicates with the sensor assembly (PWA, Hall chip . . . etc.) in relation to the clutch system. Particularly, a dual clutch system in the present invention.

In one of the embodiments, a Hall chip is used. The Hall effect is the production of a voltage difference (the Hall voltage) across an electrical conductor, transverse to an electric current in the conductor and a magnetic field perpendicular to the current. The Hall chip measures this. The Hall coefficient is defined as the ratio of the induced electric field to the product of the current density and the applied magnetic. The Hall effect is due to the nature of the current in a conductor. Current consists of the movement of many small charge carriers, typically electrons, holes, ions or all three. When a magnetic field is present that is not parallel to the direction of motion of moving charges, these charges experience a force, called the Lorentz force. When such a magnetic field is absent, the charges follow approximately straight, 'line of sight' paths between collisions with impurities, phonons, etc. However, when a magnetic field with a perpendicular component is applied, their paths between collisions are curved so that moving charges accumulate on one face of the material. This leaves equal and opposite charges exposed on the other face, where there is a scarcity of mobile charges. The result is an asymmetric distribution of charge density across the Hall element that is perpendicular to both the 'line of sight' path and the applied magnetic field. The separation of charge establishes an electric field that opposes the migration of further charge, so a steady electrical potential is established for as long as the charge is flowing.

In one embodiment, an inductive sensor is used. An inductive sensor consists of an induction loop. Electric current generates a magnetic field, which collapses generating a current that falls asymptotically toward zero from its initial trans when the input electricity ceases. The inductance of the loop changes according to the material inside it and since metals are much more effective inductors than other materials the presence of metal increases the current flowing through the loop. This change can be detected by sensing circuitry, which can signal to some other device whenever metal is detected. A coupler is used to help determine the change.

The invention is not restricted to the illustrative examples and embodiments described above. The methods are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A sensor assembly for use with a clutch assembly having a plurality of clutch plates and pressure plates, a housing positioned adjacent the plurality of clutch plates and pressure plates, at least one pair of pistons connected to the clutch plates and the pressure plates, the pistons movable within the housing, the sensor assembly comprising:

a magnet connected to each of said pistons;

a pair of magnetic sensors in communication with each of said magnets, said sensors being further in communication with an electrical control unit, a shield disposed between said pair of sensors for blocking magnetic fields between said sensors, said sensors operable to measure changes in magnetic fields as the pistons are caused to move in response to movement of the clutch plates and the pressure plates, the electronic control unit receiving an output signal from said sensors for determining the linear distance traveled of the clutch plates and pressure plates.

2. The sensor assembly of claim 1 wherein said sensors each further comprises a printed wiring assembly.

3. The sensor assembly of claim 1 wherein each of said sensors further comprises a Hall chip.

4. The sensor assembly of claim 3 wherein said sensors and Hall chips are encapsulated.

5. The sensor assembly of claim 1 wherein the housing is disc shaped and positioned around a transmission shaft adapted to support the clutch plates, pressure plates and housing.

6. A clutch assembly for a vehicle, the assembly comprising:

at least one clutch plate position around a transmission shaft;

at least one pressure plate pressure plate positioned adjacent to the at least one clutch plate, the at least one pressure plate positioned around the transmission shaft;

a housing positioned adjacent the plurality of clutch plates and pressure plates, the housing positioned around the transmission shaft;

at least one pair of pistons connected to the clutch plates and the pressure plates, the pistons being movable within the housing;

a pair of magnetic sensors in communication with the pistons, a shield disposed between said pair of sensors for blocking magnetic fields therebetween, each sensor in further in communication with an electronic control unit and operable to measure changes in magnetic fields as the pistons move relative to the sensors in response to movement of the clutch plates and the pressure plates, the electronic control unit adapted to determine the linear distance traveled of the clutch plates and pressure plates.

7. The clutch assembly of claim 6, wherein the clutch assembly is a dual clutch assembly.

8. The clutch assembly of claim 6 wherein said sensors are encapsulated.

9. The clutch assembly of claim 6 wherein each of said pistons includes a magnet in communication with said sensors.

10. The clutch assembly of claim 6 wherein each of said sensors further comprise a printed wiring assembly (PWA).

11. A Hall effect sensor assembly for use in a clutch assembly having at least one clutch plate, said sensor assembly comprising:

a housing having an interior within which are disposed a pair of movable pistons and magnets adapted to being connected to the clutch plates;

a casing containing a pair of magnetic sensors, said casing securing to an opening in said housing so that said sensors are positioned in proximity to said movable pistons;

a shield disposed between said pair of sensors for blocking magnetic fields between said sensors; and changes in the magnetic fields generated by movement of said pistons and magnets being outputted as a voltage converted signal to an electronic control unit in communication with said sensor assembly.

12. The sensor assembly of claim 11, said casing further comprising a lower portion and an upper portion, said upper portion containing an exposed plurality of pins adapted to be communicated by a plug in connector associated with the electronic control unit.

13. The sensor assembly as described in claim 12, further comprising an attachment portion integrated into said casing lower portion for attachment to said housing.

14. The sensor assembly of claim 11, further comprising a carrier plate supporting said pins, said pair of magnetic sensors being disposed on opposite sides of said carrier plate.

15. The sensor assembly of claim 14, said magnetic sensors further comprising a printed wiring assemblies.

16. The sensor assembly as described in claim 15, said printed wiring assemblies further comprising printed circuit boards, each containing a Hall effect chip.

17. The sensor assembly as described in claim 16, each of said printed circuit boards further comprising a pattern of apertures which align with and receive tabs projecting from opposite surfaces of said carrier plate.

18. The sensor assembly as described in claim 17, said carrier plate further comprising connection tabs for communicating with an additional plurality of apertures in said printed circuit boards.

19. The sensor assembly of claim 11, further comprising an encapsulating material embedding said magnetic sensors and magnetic shield.

* * * * *